United States Patent
Zhang et al.

(10) Patent No.: US 9,537,619 B2
(45) Date of Patent: Jan. 3, 2017

(54) PROCESSING METHOD FOR ORTHOGONAL FREQUENCY DIVISION MULTIPLEXING SIGNAL AND NETWORK DEVICE

(71) Applicant: Huawei Technologies Co., Ltd., Shenzhen, Guangdong (CN)

(72) Inventors: Qiang Zhang, Munich (DE); Liangchuan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/099,938

(22) Filed: Apr. 15, 2016

(65) Prior Publication Data

US 2016/0233993 A1    Aug. 11, 2016

Related U.S. Application Data

(63) Continuation of application No. PCT/CN2013/085449, filed on Oct. 18, 2013.

(51) Int. Cl.
| | |
|---|---|
| *H04L 27/00* | (2006.01) |
| *H04L 5/00* | (2006.01) |
| *H04L 27/26* | (2006.01) |
| *H04B 1/00* | (2006.01) |
| *H04L 25/03* | (2006.01) |

(52) U.S. Cl.
CPC .......... *H04L 5/0007* (2013.01); *H04B 1/0007* (2013.01); *H04L 25/03343* (2013.01); *H04L 25/03821* (2013.01); *H04L 27/265* (2013.01); *H04L 27/2607* (2013.01); *H04L 27/2626* (2013.01)

(58) Field of Classification Search
CPC ............ H04L 27/0008; H04L 27/2607; H04L 27/2626; H04L 27/362; H04L 5/0007; H04L 25/03343; H04L 27/2627; H04L 27/2647; H04B 10/60
USPC ......... 375/295, 296, 299; 398/118, 202, 187
See application file for complete search history.

(56) References Cited

U.S. PATENT DOCUMENTS

| | | | |
|---|---|---|---|
| 2004/0004936 A1 * | 1/2004 | Ginesi ............... | H04L 25/03012 370/210 |
| 2009/0304097 A1 * | 12/2009 | Han .................... | H04L 27/2618 375/260 |
| 2010/0098411 A1 * | 4/2010 | Nakashima ............ | H04B 10/60 398/25 |

(Continued)

OTHER PUBLICATIONS

Mumtaz Ali et al., "Effects of Symbol Time Misalignment and Frequency Offset on Performance of Realistic All-Optical OFDM System", Jun. 23, 2013, 4 pages.

(Continued)

*Primary Examiner* — Leila Malek

(57) ABSTRACT

The present invention is applicable to the communications field and provides a processing method for an orthogonal frequency division multiplexing (OFDM) signal and a network device. The processing method includes: obtaining an orthogonal frequency division multiplexing OFDM signal; multiplying, in a digital domain, the obtained OFDM signal by a simple harmonic wave whose frequency is fs to obtain a frequency shifted signal; and outputting and loading the frequency shifted signal by using a digital-to-analog conversion (DAC) to a driver and a modulator to send the frequency shifted OFDM signal.

11 Claims, 4 Drawing Sheets

(56) References Cited

U.S. PATENT DOCUMENTS

2012/0141130 A1* 6/2012 Nakashima .......... H04B 10/572
398/82
2015/0382237 A1* 12/2015 Kim ........................ H04J 11/00
370/210

OTHER PUBLICATIONS

Xianbin Wang et al., "Robust Channel Estimation and ISI Cancellation for OFDM Systems With Suppressed Features", IEEE Journal on Selected Areas in Communications. vol. 23, No. 5, May 1, 2005, p. 963-972.

Longquan Chen et al., "Wide-Range Frequency Offset Estimation Method for a DD-OFDM-PON Downstream System", Journal of Optical Communications and Networking, vol. 4, No. 7, Jul. 1, 2012, p. 565-570.

* cited by examiner

PROCESSING METHOD FOR ORTHOGONAL FREQUENCY DIVISION MULTIPLEXING SIGNAL AND NETWORK DEVICE

CROSS-REFERENCE TO RELATED APPLICATIONS

This application is a continuation of International Application No. PCT/CN2013/085449, filed Oct. 18, 2013, which is hereby incorporated by reference in its entirety.

TECHNICAL FIELD

The present invention relates to the communications field, and in particular, to a processing method for an orthogonal frequency division multiplexing signal and a network device.

BACKGROUND

With the development of the long-distance transmission technology and the access technology, at present, a dumbbell type is presented in network development, and a metropolitan-area capacity becomes a bottleneck for further improving a network capacity. A large-capacity metropolitan-area transmission solution needs to be cost-effective while meeting a capacity requirement. A solution used in long-distance transmission is costly. A capacity in an existing commercial short-distance solution soon cannot meet a requirement.

In a metropolitan-area/short-distance solution, a direct detection orthogonal frequency division multiplexing (direct detection orthogonal frequency domain multiplexing, DDOFDM for short) solution is promising. A principle of an orthogonal frequency division multiplexing (Orthogonal Frequency Division Multiplexing, OFDM for short) technology is: When a series of subcarriers whose frequency grid is $\Delta f$ are modulated at a rate of $\Delta f$, the modulated subcarriers are mutually orthogonal. This process may be implemented by means of inverse fast Fourier transform (inverse fast fourier transform, IFFT for short) and fast Fourier transform (fast fourier transform, FFT for short), and a property of strong dispersion resistance may be achieved by adding a cyclic prefix (cyclic prefix, CP for short). However, subcarrier-subcarrier beating interference (subcarrier-subcarrier beating interference, SSBI for short) occurs during direct detection, severely affecting system performance. During transmission, an optical carrier and a modulated signal both are transmitted. A process of detection by an optoelectronic detector (PD) is essentially a process of detecting a beat between optical signals. At a transmit end, a detected optical signal mainly includes two parts: an optical carrier (Scarrier) and a modulated optical signal SOFDM. At a receive end, that is, at the optoelectronic detector, an output signal is proportional to an optical power P. $P=(S_{carrier}+S_{OFDM})(S^*_{carrier}+S^*_{OFDM})=S_{carrier}S^*_{carrier}+S_{carrier}S^*_{OFDM}+S_{OFDM}S^*_{OFDM}$, where $S_{carrier}S^*_{carrier}$ is a direct current item, $S_{carrier}S^*_{OFDM}$ is a beat item between an optical carrier and an optical signal that are expected to be obtained, and $S_{carrier}S^*_{OFDM}$ is SSBI noise. The SSBI noise severely affects system performance, and therefore, how to reduce and eliminate the SSBI noise becomes a key technology for a DDOFDM system.

In the prior art, two methods for reducing subcarrier crosstalk are provided:

First: At a transmit end, signals are filled only on a band whose spectrum range is [W, 2W], where W is a bandwidth occupied by a modulated signal. In this case, at a receive end, a spectrum range for distribution of SSBI noise is [0, W], and the entire noise does not overlap the signal so that the signal can avoid being affected by the SSBI noise.

Second: During signal transmission, data is filled only on odd-numbered subcarriers. Herein, the subcarriers are marked as $(2k+1)\Delta f$ ($k=1, 2$, and then SSBI is on subcarriers that are of frequency differences between the odd-numbered subcarriers and that are marked as $2m\Delta f$ ($m=1, 2, 3 \ldots$). It can be seen that a detected signal and SSBI noise are separately located on different subcarriers, that is, the signal is located on an odd-numbered subcarrier, and the SSBI is located on an even-numbered subcarrier, thereby avoiding impact from the SSBI noise.

In an implementation of the solutions in the prior art, it is found that the prior art has the following technical problem:

At both a transmit end and a receive end, a double signal bandwidth is required to eliminate SSBI noise, and bandwidth utilization is low.

SUMMARY

An objective of the present invention is to provide a processing method for an OFDM signal to resolve a problem of low bandwidth utilization in an existing technical solution.

According to a first aspect, a processing method for an orthogonal frequency division multiplexing OFDM signal is provided, where the processing method includes:

multiplying, in a digital domain, a generated OFDM signal by a simple harmonic wave whose frequency is fs to obtain a frequency shifted OFDM signal;

performing digital-to-analog conversion on the frequency shifted OFDM signal to obtain an OFDM signal after the digital-to-analog conversion;

amplifying the OFDM signal after the digital-to-analog conversion by using a driver, to obtain an amplified OFDM signal; and modulating the amplified OFDM signal by using a modulator and sending a modulated OFDM signal, where fs is equal to $\Delta f/n$, n is an integer greater than 1, and $\Delta f$ is a frequency difference between two adjacent subcarriers for the obtained OFDM signal.

With reference to the processing method for an orthogonal frequency division multiplexing OFDM signal provided in the first aspect, in a first optional solution of the first aspect, n is 2.

With reference to the processing method for an orthogonal frequency division multiplexing OFDM signal provided in the first aspect, in a second optional solution of the first aspect, before the multiplying, in a digital domain, a generated OFDM signal by a simple harmonic wave whose frequency is fs, the processing method further includes:

mapping to-be-sent binary data to obtain constellation point data;

performing serial-to-parallel conversion on the constellation point data to obtain arranged constellation point data;

performing inverse fast Fourier transform IFFT on the arranged constellation point data to obtain a time-domain signal; and performing parallel-to-serial conversion on the time-domain signal to obtain an arranged time-domain signal, and obtaining the generated OFDM signal by performing a step of adding a cyclic prefix to the arranged time-domain signal.

With reference to the processing method for an orthogonal frequency division multiplexing OFDM signal provided in the first aspect, in a third optional solution of the first aspect, the simple harmonic wave is specifically:

$e^{z2\pi t f s}$, where z is an imaginary unit, and t is time.

According to a second aspect, a processing method for an orthogonal frequency division multiplexing OFDM signal is provided, where the processing method includes:

receiving an OFDM signal, where the OFDM signal is a frequency shifted OFDM signal, a frequency shift amount of the frequency shift is fs, fs is equal to $\Delta f/n$, n is an integer greater than 1, and $\Delta f$ is a frequency difference between two adjacent subcarriers for the obtained OFDM signal; and removing a cyclic prefix from the OFDM signal to obtain a signal having no cyclic prefix, performing serial-to-parallel conversion on the signal having no cyclic prefix to obtain an arranged time-domain signal, performing a fast Fourier transform FFT operation on the arranged time-domain signal to obtain a frequency-domain signal, performing a channel equalization operation on the frequency-domain signal to obtain constellation point data, and demapping the constellation point data to obtain binary data, where a quantity of points in the FFT operation is n times of a quantity of points in an inverse fast Fourier transform IFFT operation that is used for generating an OFDM signal before the frequency shift, and n is an integer greater than 1.

With reference to the processing method for an orthogonal frequency division multiplexing OFDM signal provided in the second aspect, in a first optional solution of the second aspect, n is 2.

According to a third aspect, a network device is provided, where the device includes: a processor, a digital-to-analog converter, a driver, and a modulator, where the processor is configured to multiply, in a digital domain, a generated OFDM signal by a simple harmonic wave whose frequency is fs to obtain a frequency shifted OFDM signal;

the digital-to-analog converter is configured to perform digital-to-analog conversion on the frequency shifted OFDM signal to obtain an OFDM signal after the digital-to-analog conversion;

the driver is configured to amplify the OFDM signal after the digital-to-analog conversion to obtain an amplified OFDM signal; and the modulator is configured to modulate the amplified OFDM signal to obtain a modulated OFDM signal for sending, where fs is equal to $\Delta f/n$, n is an integer greater than 1, and $\Delta f$ is a frequency difference between two adjacent subcarriers for the obtained OFDM signal.

With reference to the network device provided in the third aspect, in a first optional solution of the third aspect, n is 2.

With reference to the network device provided in the third aspect, in a second optional solution of the third aspect, the processor further maps to-be-sent binary data to obtain constellation point data; performs serial-to-parallel conversion on the constellation point data to obtain arranged constellation point data; performs inverse fast Fourier transform IFFT on the arranged constellation point data to obtain a time-domain signal; and performs parallel-to-serial conversion on the time-domain signal to obtain an arranged time-domain signal, and obtains the generated OFDM signal by performing a step of adding a cyclic prefix to the arranged time-domain signal.

According to a fourth aspect, a network device is provided, where the device includes: a processor and an optoelectronic detector, where the optoelectronic detector is configured to perform optical-to-electrical conversion on a received signal; and the processor is configured to synchronize the signal after the optical-to-electrical conversion to obtain a start point of an orthogonal frequency division multiplexing OFDM signal, where the OFDM signal is a frequency shifted OFDM signal, a frequency shift amount of the frequency shift is fs, fs is equal to $\Delta f/n$, n is an integer greater than 1, and $\Delta f$ is a frequency difference between two adjacent subcarriers for the obtained OFDM signal; and the processor is further configured to remove a cyclic prefix starting from the start point of the OFDM signal to obtain a signal having no cyclic prefix, perform serial-to-parallel conversion on the signal having no cyclic prefix to obtain an arranged time-domain signal, perform an FFT operation on the arranged time-domain signal to obtain a frequency-domain signal, perform a channel equalization operation on the frequency-domain signal to obtain constellation point data, and demap the constellation point data to obtain binary data, where a quantity of points in the FFT operation is n times of a quantity of points in an inverse fast Fourier transform IFFT operation that is used for generating an OFDM signal before the frequency shift.

With reference to the network device provided in the fourth aspect, in a first optional solution of the fourth aspect, n is 2.

According to a fifth aspect, a processing system for an orthogonal frequency division multiplexing OFDM signal is provided, where the system includes: a network device on a transmit side and a network device on a receive side, where the network device on the transmit side is configured to multiply, in a digital domain, a generated OFDM signal by a simple harmonic wave whose frequency is fs to obtain a frequency shifted OFDM signal; perform digital-to-analog conversion on the frequency shifted OFDM signal to obtain an OFDM signal after the digital-to-analog conversion; amplify the OFDM signal after the digital-to-analog conversion to obtain an amplified OFDM signal; and modulate the amplified OFDM signal and send a modulated OFDM signal, where fs is equal to $\Delta f/n$, n is an integer greater than 1, and $\Delta f$ is a frequency difference between two adjacent subcarriers for the obtained OFDM signal; and the network device on the receive side is configured to receive the modulated OFDM signal; and remove a cyclic prefix from the OFDM signal to obtain a signal having no cyclic prefix, perform serial-to-parallel conversion on the signal having no cyclic prefix to obtain an arranged time-domain signal, perform a fast Fourier transform FFT operation on the arranged time-domain signal to obtain a frequency-domain signal, perform a channel equalization operation on the frequency-domain signal to obtain constellation point data, and demap the constellation point data to obtain binary data, where a quantity of points in the FFT operation is n times of a quantity of points in an inverse fast Fourier transform IFFT operation that is used for generating an OFDM signal before the frequency shift.

With reference to the processing system for an orthogonal frequency division multiplexing OFDM signal provided in the fifth aspect, in a first optional solution of the fifth aspect, the network device on the transmit side is the network device provided in the third aspect, the first optional solution provided in the third aspect, or the second optional solution provided in the third aspect, and the network device on the receive side is the network device provided in the fourth aspect or the first optional solution provided in the fourth aspect.

In the embodiments of the present invention, according to the technical solutions provided in the present invention, in specific implementation manners provided in the present invention, a frequency of an OFDM signal is shifted by fs on a transmit side, so that each OFDM signal is not located on a subcarrier, because a subcarrier for fs is shifted. For SSBI noise, because a reason causing the SSBI noise is that any two OFDM signals are subtracted, the SSBI noise after the subtraction of the signals is located on an OFDM subcarrier, so that the OFDM signal has a subcarrier different from that of the SSBI noise, thereby eliminating the SSBI noise. In addition, because fs is Δf/n, a bandwidth wasted by the SSBI noise is only Δf/n. For OFDM, Δf/n is almost negligible, and therefore according to the technical solutions, the SSBI noise can still be eliminated without a double bandwidth. Therefore, the technical solutions have an advantage of improving bandwidth utilization.

DETAILED DESCRIPTION

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

Figure 1:
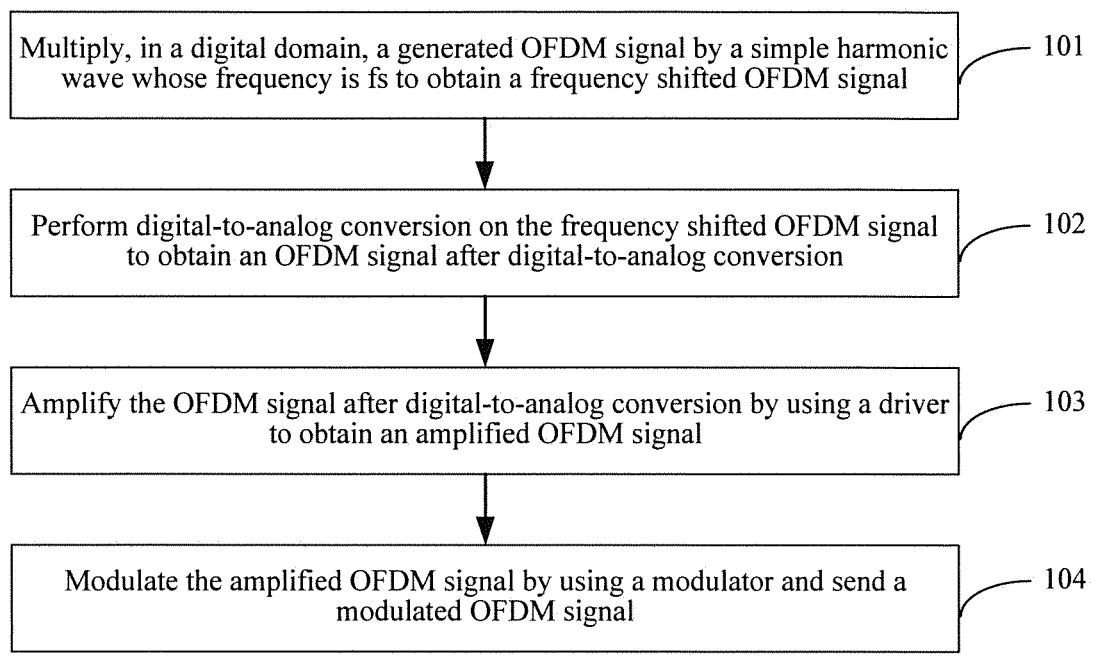
FIG. 1 is a flowchart of a processing method for an OFDM signal according to a specific implementation manner of the present invention.

An embodiment of the present invention provides a processing method for an OFDM signal, where the method is implemented by a network device, and is specifically executed by a digital signal processor (Digital Signal Processing, DSP for short) of the network device. The method is shown in FIG. 1, including:

101: Multiply, in a digital domain, a generated OFDM signal by a simple harmonic wave whose frequency is fs to obtain a frequency shifted OFDM signal.

102: Perform digital-to-analog conversion on the frequency shifted OFDM signal to obtain an OFDM signal after the digital-to-analog conversion.

The foregoing digital-to-analog conversion may be completed by using a digital-to-analog converter (Digital to analog converter, DAC for short)

103: Amplify the OFDM signal after the digital-to-analog conversion by using a driver to obtain an amplified OFDM signal.

104: Modulate the amplified OFDM signal by using a modulator and send a modulated OFDM signal.

fs is equal to Δf/n, n is an integer greater than 1, and Δf is a frequency difference between two adjacent subcarriers for the obtained OFDM signal.

Optionally, n is preferably 2. Being preferably 2 not only reduces a quantity of points in an FFT operation but also maximizes a frequency difference between a subcarrier for the OFDM signal and a subcarrier for SSBI noise, thereby further improving an effect of eliminating the SSBI noise. A specific reason is that, when n is 2, the quantity of points in the FFT operation are only twice of that in IFFT. In addition, each OFDM signal is loaded on a subcarrier for MΔf+½Δf, and SSBI noise is located on a subcarrier for QΔf, so that a difference between the subcarrier on which the SSBI noise is located and the subcarrier on which the OFDM signal is loaded is at least ½Δf. In this case, because a frequency difference between the SSBI noise and the OFDM signal is maximum, inference from the SSBI noise to the OFDM signal is minimum, and therefore the effect of eliminating the SSBI noise can be further improved. It should be noted that M is an integer greater than or equal to 0, and Q is an integer greater than or equal to 1.

Before 101, the method may further include: mapping to-be-sent binary data to obtain constellation point data; performing serial-to-parallel conversion on the constellation point data to obtain arranged constellation point data; performing inverse fast Fourier transform IFFT on the arranged constellation point data to obtain a time-domain signal; and performing parallel-to-serial conversion on the time-domain signal to obtain an arranged time-domain signal, and obtaining the generated OFDM signal by performing a step of adding a cyclic prefix to the arranged time-domain signal.

Optionally, the simple harmonic wave may be specifically: $e^{z2\pi t fs}$, where z is an imaginary unit, and t is time.

In this specific implementation manner provided in the present invention, a frequency of an OFDM signal is shifted by fs on a transmit side, so that each OFDM signal is not located on a subcarrier, because a subcarrier for fs is shifted. For SSBI noise, because a reason causing the SSBI noise is that any two OFDM signals are subtracted, the SSBI noise after the subtraction of the signals is located on an OFDM subcarrier, so that the OFDM signal has a subcarrier different from that of the SSBI noise, thereby eliminating the SSBI noise. In addition, because fs is Δf/n, a bandwidth wasted by the SSBI noise is only Δf/n. For OFDM, Δf/n is almost negligible, and therefore according to the technical solution, the SSBI noise can still be eliminated without a double bandwidth.

Figure 2:
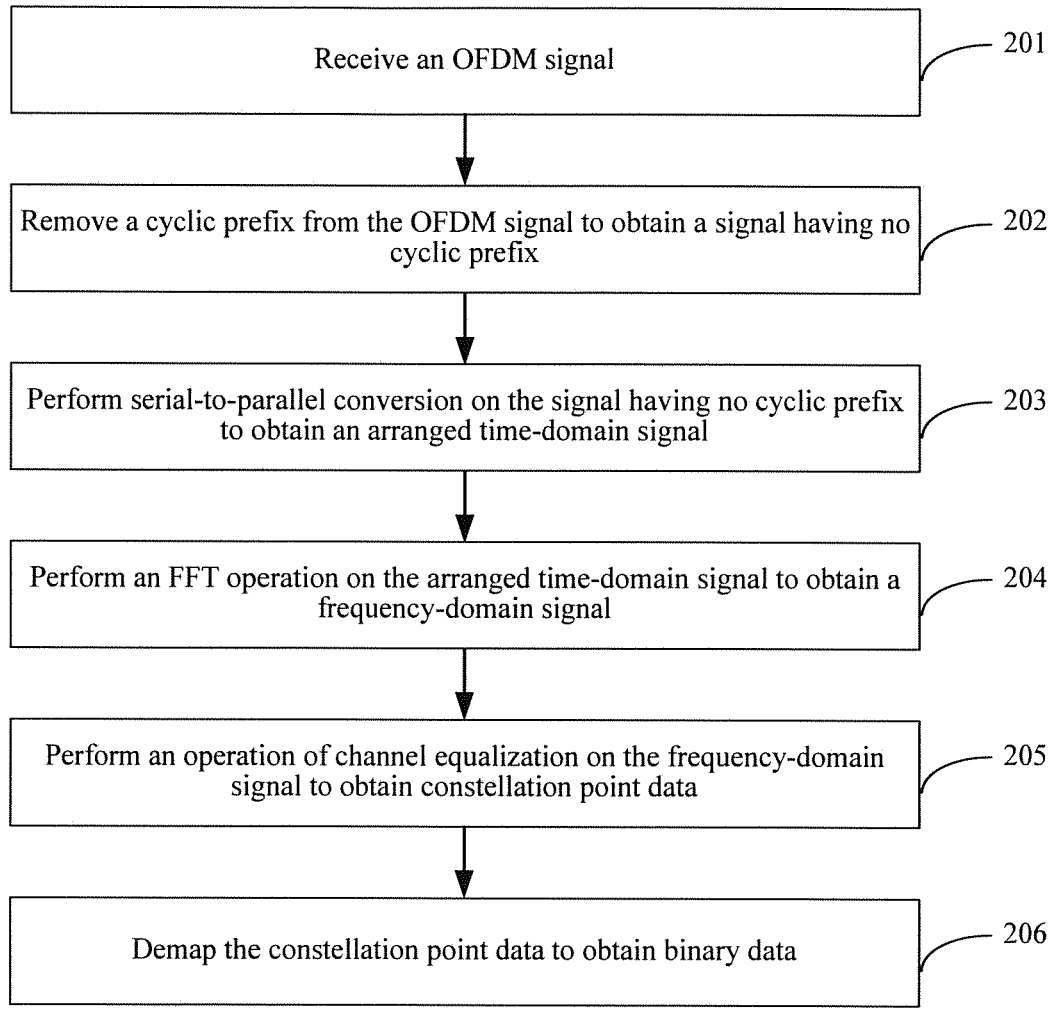
FIG. 2 is a flowchart of another processing method for an OFDM signal according to a specific implementation manner of the present invention.

A specific implementation manner of the present invention further provides a processing method for an OFDM signal, where the method is completed by a network device on a receive side, and is specifically executed by a DSP. The method is shown in FIG. 2, including:

201: Receive an OFDM signal, where the OFDM signal is a frequency shifted OFDM signal, and a frequency shift amount of the frequency shift is fs.

202: Remove a cyclic prefix from the OFDM signal to obtain a signal having no cyclic prefix.

203: Perform serial-to-parallel conversion on the signal having no cyclic prefix to obtain an arranged time-domain signal.

204: Perform an FFT operation on the arranged time-domain signal to obtain a frequency-domain signal.

205: Perform a channel equalization operation on the frequency-domain signal to obtain constellation point data.

206: Demap the constellation point data to obtain binary data.

A quantity of points in the FFT operation may be n times of a quantity of points in an inverse fast Fourier transform IFFT operation that is used for generating an OFDM signal before the frequency shift. The quantity of points in the FFT operation is a quantity of sampling points when the FFT operation is performed, and the quantity of points in the IFFT operation is a quantity of sampling points when the IFFT operation is performed.

Optionally, an implementation manner of the receiving an OFDM signal may be specifically: receiving an optical signal, converting the optical signal into an electrical signal by using an optoelectronic detector, and synchronizing the electrical signal to obtain a start point of the OFDM signal, that is, receiving the OFDM signal.

The quantity of points in the FFT operation is n times of the quantity of points in the IFFT operation because the OFDM signal is not located on a subcarrier because of the frequency shift, and if the FFT operation is still performed by using a normal quantity of points (that is, the quantity of points in the IFFT operation), the OFDM signal cannot be obtained, and the OFDM signal can be obtained only when the quantity of points in the FFT operation is increased.

Optionally, n is preferably 2.

Figure 3:
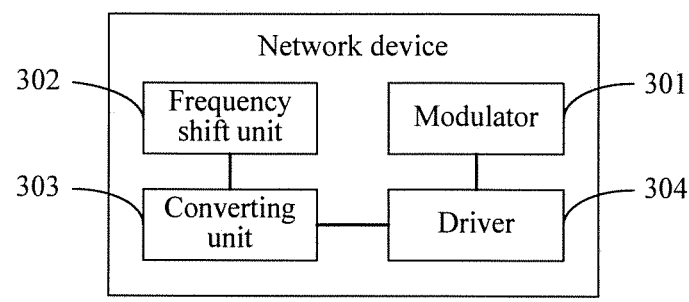
FIG. 3 is a structural diagram of a network device according to a specific implementation manner of the present invention.

A specific implementation manner of the present invention provides a network device, where the network device is shown in FIG. 3, including:

a frequency shift unit 302, configured to multiply, in a digital domain, a generated OFDM signal by a simple harmonic wave whose frequency is fs to obtain a frequency shifted OFDM signal;

a converting unit 303, configured to perform digital-to-analog conversion on the frequency shifted OFDM signal to obtain an OFDM signal after the digital-to-analog conversion;

a driver 304, configured to amplify the OFDM signal after the digital-to-analog conversion to obtain an amplified OFDM signal; and a modulator 301, configured to modulate the amplified OFDM signal to obtain a modulated OFDM signal for sending, where fs is equal to $\Delta f/n$, n is an integer greater than 1, and $\Delta f$ is a frequency difference between two adjacent subcarriers for the obtained OFDM signal.

Optionally, n is preferably 2.

Optionally, the network device specifically further includes:

a mapping module, configured to map to-be-sent binary data to obtain constellation point data;

a serial-to-parallel conversion module, configured to perform serial-to-parallel conversion on the constellation point data to obtain arranged constellation point data;

a transform module, configured to perform inverse fast Fourier transform IFFT on the arranged constellation point data to obtain a time-domain signal; and a cycling module, configured to perform parallel-to-serial conversion on the time-domain signal to obtain an arranged time-domain signal, and obtain the generated OFDM signal by performing a step of adding a cyclic prefix.

Figure 4:
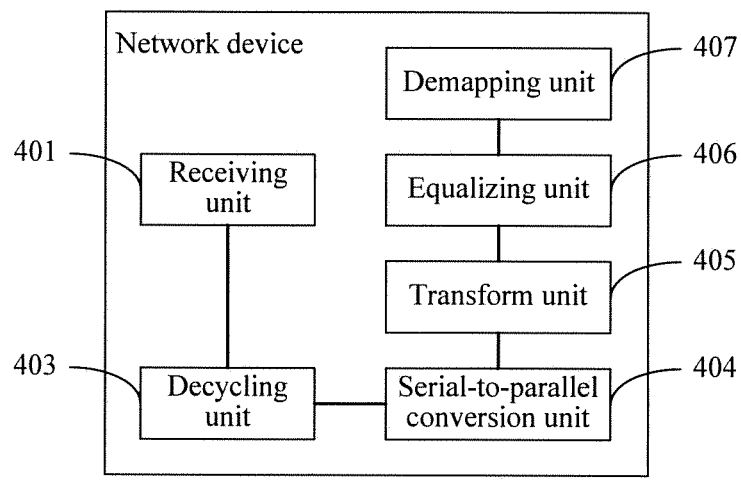
FIG. 4 is a structural diagram of another network device according to a specific implementation manner of the present invention.

A specific implementation manner of the present invention further provides a network device, where the network device is shown in FIG. 4, including:

a receiving unit 401, configured to receive an OFDM signal, where the OFDM signal is a frequency shifted OFDM signal, a frequency shift amount of the frequency shift is fs, fs is equal to $\Delta f/n$, n is an integer greater than 1, and $\Delta f$ is a frequency difference between two adjacent subcarriers for the obtained OFDM signal; and a decycling unit 403, configured to remove a cyclic prefix from the OFDM signal to obtain a signal having no cyclic prefix;

a serial-to-parallel conversion unit 404, configured to perform serial-to-parallel conversion on the signal having no cyclic prefix to obtain an arranged time-domain signal;

a transform unit 405, configured to perform an FFT operation on the arranged time-domain signal to obtain a frequency-domain signal;

an equalizing unit 406, configured to perform a channel equalization operation on the frequency-domain signal to obtain constellation point data; and a demapping unit 407, configured to demap the constellation point data to obtain binary data, where a quantity of points in the FFT operation is n times of a quantity of points in an IFFT operation.

Optionally, n is preferably 2.

Figure 5:
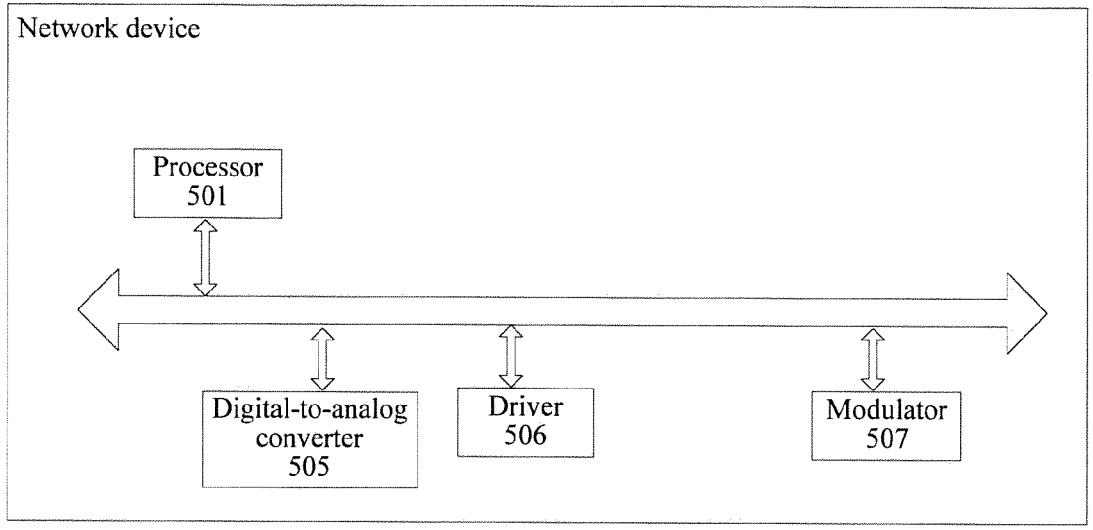
FIG. 5 is a structural diagram of hardware of a network device according to a specific implementation manner of the present invention.

A specific implementation manner of the present invention provides a network device, where the network device may be specifically a router, a network switch, or a base station. A structural diagram of hardware of the network device is shown in FIG. 5, including: a processor 501, a digital-to-analog converter 505, a driver 506, and a modulator 507.

The processor 501 may be a general purpose processor, including a digital signal processor (Digital Signal Processing, DSP for short), a central processing unit (central processing unit, CPU), a network processor (network processor, NP for short), and the like.

The processor 501 is configured to multiply, in a digital domain, a generated OFDM signal by a simple harmonic wave whose frequency is fs to obtain a frequency shifted OFDM signal;

the digital-to-analog converter 505 is configured to perform digital-to-analog conversion on the frequency shifted OFDM signal to obtain an OFDM signal after the digital-to-analog conversion;

the driver 506 is configured to amplify the OFDM signal after the digital-to-analog conversion to obtain an amplified OFDM signal; and the modulator 507 is configured to modulate the amplified OFDM signal to obtain a modulated OFDM signal for sending, where fs is equal to $\Delta f/n$, n is an integer greater than 1, and $\Delta f$ is a frequency difference between two adjacent subcarriers for the obtained OFDM signal.

Optionally, n is preferably 2.

Optionally, before multiplying, in the digital domain, the generated OFDM signal by the simple harmonic wave whose frequency is fs, the processor 501 specifically maps to-be-sent binary data to obtain constellation point data; performs serial-to-parallel conversion on the constellation point data to obtain arranged constellation point data; performs inverse fast Fourier transform IFFT on the arranged constellation point data to obtain a time-domain signal; and performs parallel-to-serial conversion on the time-domain signal to obtain an arranged time-domain signal, and obtains the generated OFDM signal by performing a step of adding a cyclic prefix to the arranged time-domain signal.

Figure 6:
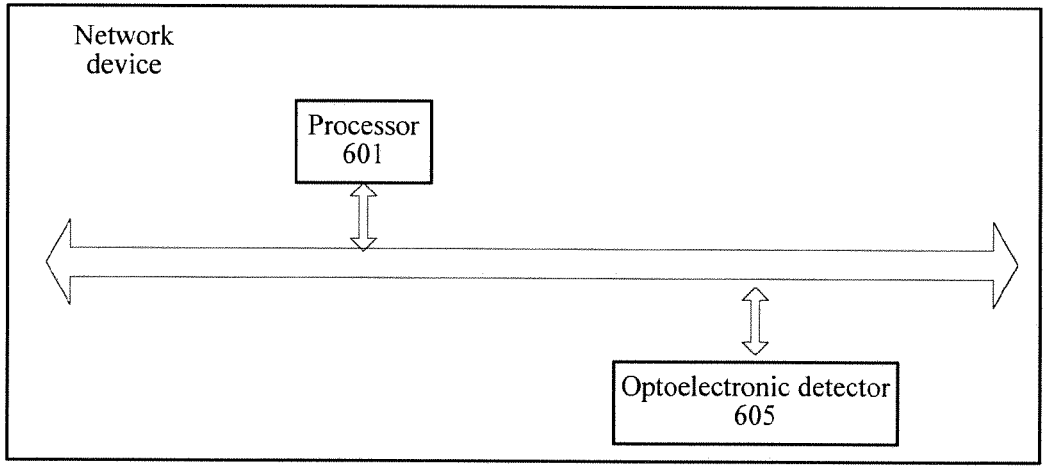
FIG. 6 is a structural diagram of hardware of a network device according to a specific implementation manner of the present invention.

A specific implementation manner of the present invention further provides a network device, where the network device may be specifically a router, a network switch, or a base station. A structural diagram of hardware of the network device is shown in FIG. 6, including: a processor 601 and an optoelectronic detector 605.

The processor 601 may be a general purpose processor, including a digital signal processor (Digital Signal Processing, DSP for short), a central processing unit (central processing unit, CPU), a network processor (network processor, NP for short), and the like.

The optoelectronic detector 605 is configured to perform optical-to-electrical conversion on a received signal; and the processor 601 is configured to synchronize the signal after the optical-to-electrical conversion to obtain a start point of an orthogonal frequency division multiplexing OFDM signal, where the OFDM signal is a frequency shifted OFDM signal, a frequency shift amount of the frequency shift is fs, fs is equal to Δf/n, n is an integer greater than 1, and Δf is a frequency difference between two adjacent subcarriers for the obtained OFDM signal; and the processor is further configured to remove a cyclic prefix starting from the start point of the OFDM signal to obtain a signal having no cyclic prefix, perform serial-to-parallel conversion on the signal having no cyclic prefix to obtain an arranged time-domain signal, perform an FFT operation on the arranged time-domain signal to obtain a frequency-domain signal, perform a channel equalization operation on the frequency-domain signal to obtain constellation point data, and demap the constellation point data to obtain binary data, where a quantity of points in the FFT operation is n times of a quantity of points in an inverse fast Fourier transform IFFT operation that is used for generating an OFDM signal before the frequency shift.

Optionally, n is preferably 2.

A specific implementation manner of the present invention further provides a processing system for an OFDM signal, where the system includes: a network device on a transmit side and a network device on a receive side, where the network device on the transmit side is configured to multiply, in a digital domain, a generated OFDM signal by a simple harmonic wave whose frequency is fs to obtain a frequency shifted OFDM signal; perform digital-to-analog conversion on the frequency shifted OFDM signal to obtain an OFDM signal after the digital-to-analog conversion; amplify the OFDM signal after the digital-to-analog conversion to obtain an amplified OFDM signal; and modulate the amplified OFDM signal and send a modulated OFDM signal, where fs is equal to Δf/n, n is an integer greater than 1, and Δf is a frequency difference between two adjacent subcarriers for the obtained OFDM signal; and the network device on the receive side is configured to receive the modulated OFDM signal; and remove a cyclic prefix from the OFDM signal to obtain a signal having no cyclic prefix, perform serial-to-parallel conversion on the signal having no cyclic prefix to obtain an arranged time-domain signal, perform an FFT operation on the arranged time-domain signal to obtain a frequency-domain signal, perform a channel equalization operation on the frequency-domain signal to obtain constellation point data, and demap the constellation point data to obtain binary data, where a quantity of points in the FFT operation is n times of a quantity of points in an inverse fast Fourier transform IFFT operation that is used for generating an OFDM signal before the frequency shift.

Optionally, n is equal to 2.

Optionally, the device on the transmit side may be specifically the network device provided in the embodiment corresponding to FIG. 5, and the device on the receive side may be specifically the network device provided in the embodiment corresponding to FIG. 6.

A person skilled in the art may understand that all or some of the steps of the technical solutions in the embodiments of the present invention may be implemented by a program instructing related hardware, for example, implemented by a computer running the program. The program may be stored in a readable storage medium, for example, a random access memory, a magnetic disk, or an optical disc.

The foregoing descriptions are merely exemplary embodiments of the present invention, but are not intended to limit the present invention. Any equivalent replacement or improvement made without departing from the specific implementation manners of the present invention should fall within the protection scope of the present invention.

What is claimed is:

1. A processing method for an orthogonal frequency division multiplexing (OFDM) signal, the method comprising:

multiplying, in a digital domain, a generated OFDM signal by a simple harmonic wave having frequency fs to obtain a frequency shifted OFDM signal;

performing digital-to-analog conversion on the frequency shifted OFDM signal to obtain an OFDM signal after the digital-to-analog conversion;

amplifying the OFDM signal after the digital-to-analog conversion by using a driver, to obtain an amplified OFDM signal; and modulating the amplified OFDM signal by using a modulator and sending a modulated OFDM signal, wherein:

fs is equal to Δf/n, n is an integer greater than 1, and Δf is a frequency difference between two adjacent subcarriers for the obtained OFDM signal.

2. The processing method according to claim 1, wherein n is 2.

3. The processing method according to claim 1, wherein before multiplying, in a digital domain, a generated OFDM signal by a simple harmonic wave having frequency fs, the method further comprises:

mapping to-be-sent binary data to obtain constellation point data;

performing serial-to-parallel conversion on the constellation point data to obtain arranged constellation point data;

performing inverse fast Fourier transform (IFFT) on the arranged constellation point data to obtain a time-domain signal; and performing parallel-to-serial conversion on the time-domain signal to obtain an arranged time-domain signal, and obtaining the generated OFDM signal by performing a step of adding a cyclic prefix to the arranged time-domain signal.

4. The method according to claim 1, wherein the simple harmonic wave comprises:

$e^{z2\pi t f s}$, wherein z is an imaginary unit, and t is time.

5. A processing method for an orthogonal frequency division multiplexing (OFDM) signal, the method comprising:

receiving an OFDM signal, wherein the OFDM signal is a frequency shifted OFDM signal, a frequency shift amount of the frequency shift is fs, fs is equal to Δf/n, n is an integer greater than 1, and Δf is a frequency difference between two adjacent subcarriers for the OFDM signal; and removing a cyclic prefix from the OFDM signal to obtain a signal having no cyclic prefix;

performing serial-to-parallel conversion on the signal having no cyclic prefix to obtain an arranged time-domain signal;

performing a fast Fourier transform (FFT) operation on the arranged time-domain signal to obtain a frequency-domain signal;

performing a channel equalization operation on the frequency-domain signal to obtain constellation point data;

demapping the constellation point data to obtain binary data; and wherein a quantity of points in the FFT operation is n times of a quantity of points in an inverse fast Fourier transform IFFT operation that is used for generating an OFDM signal before the frequency shift, and n is an integer greater than 1.

6. The processing method according to claim 5, wherein n is 2.

7. A network device, comprising:
a processor configured to multiply, in a digital domain, a generated orthogonal frequency division multiplexing (OFDM) signal by a simple harmonic wave having frequency fs to obtain a frequency shifted OFDM signal;

a digital-to-analog-converter configured to perform digital-to-analog conversion on the frequency shifted OFDM signal to obtain an OFDM signal after the digital-to-analog conversion;

a driver configured to amplify the OFDM signal after the digital-to-analog conversion to obtain an amplified OFDM signal;

a modulator configured to modulate the amplified OFDM signal to obtain a modulated OFDM signal for sending; and wherein fs is equal to $\Delta f/n$, n is an integer greater than 1, and $\Delta f$ is a frequency difference between two adjacent subcarriers for the obtained OFDM signal.

8. The network device according to claim 7, wherein n is 2.

9. The network device according to claim 7, wherein the processor is further configured to:
map to-be-sent binary data to obtain constellation point data;

perform serial-to-parallel conversion on the constellation point data to obtain arranged constellation point data;

perform inverse fast Fourier transform (IFFT) on the arranged constellation point data to obtain a time-domain signal;

perform parallel-to-serial conversion on the time-domain signal to obtain an arranged time-domain signal; and obtain the generated OFDM signal by performing a step of adding a cyclic prefix to the arranged time-domain signal.

10. A network device, comprising:
an optoelectronic detector configured to perform optical-to-electrical conversion on a received signal; and a processor configured to:
synchronize the signal after the optical-to-electrical conversion to obtain a start point of an orthogonal frequency division multiplexing (OFDM) signal, wherein the OFDM signal is a frequency shifted OFDM signal, a frequency shift amount of the frequency shift is fs, fs is equal to $\Delta f/n$, n is an integer greater than 1, and $\Delta f$ is a frequency difference between two adjacent subcarriers for the OFDM signal, remove a cyclic prefix starting from the start point of the OFDM signal to obtain a signal having no cyclic prefix, perform serial-to-parallel conversion on the signal having no cyclic prefix to obtain an arranged time-domain signal, perform a fast Fourier transform (FFT) operation on the arranged time-domain signal to obtain a frequency-domain signal, perform a channel equalization operation on the frequency-domain signal to obtain constellation point data, and demap the constellation point data to obtain binary data; and wherein a quantity of points in the FFT operation is n times of a quantity of points in an inverse fast Fourier transform (IFFT) operation that is used for generating an OFDM signal before the frequency shift.

11. The network device according to claim 10, wherein n is 2.

* * * * *